US010174870B2

(12) United States Patent
Berardi

(10) Patent No.: US 10,174,870 B2
(45) Date of Patent: *Jan. 8, 2019

(54) EXPANDABLE AND CONTRACTIBLE GARDEN HOSE

(71) Applicant: Blue Gentian, LLC, Palm Beach Gardens, FL (US)

(72) Inventor: Michael J. Berardi, Palm Beach Gardens, FL (US)

(73) Assignee: Telebrands Corp., Fairfield, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/794,662

(22) Filed: Oct. 26, 2017

(65) Prior Publication Data

US 2018/0045340 A1    Feb. 15, 2018

Related U.S. Application Data

(60) Continuation-in-part of application No. 15/440,841, filed on Feb. 23, 2017, now Pat. No. 9,841,127, which
(Continued)

(51) Int. Cl.
*F16L 11/12*    (2006.01)
*F16L 11/04*    (2006.01)
(Continued)

(52) U.S. Cl.
CPC ............... *F16L 11/04* (2013.01); *F16L 11/00* (2013.01); *F16L 11/12* (2013.01); *F16L 33/01* (2013.01)

(58) Field of Classification Search
CPC ...... F16L 11/111; F16L 11/118; F16L 11/112; F16L 11/115
(Continued)

(56) References Cited

U.S. PATENT DOCUMENTS 25,239 A    8/1859    Boyd
D31,614 S    3/1861    Mayall
(Continued)

FOREIGN PATENT DOCUMENTS

CA    2779882    8/2012
CN    1266155    9/2000
(Continued)

OTHER PUBLICATIONS

Anonymous, Slastix Loops korkotel—R-med webaruhaz, YouTube Internet video product demonstration, URL: https://www.youtube.com/watch?v=aT4kbfjANR0, (retrieved Nov. 25, 2013).
(Continued)

*Primary Examiner* — Patrick F Brinson
(74) *Attorney, Agent, or Firm* — McHale & Slavin, P.A.

(57) ABSTRACT

A hose which automatically expands longitudinally and automatically expands laterally upon the application of a pressurized liquid is disclosed. The hose can automatically expand longitudinally up to six times its unexpanded or contracted length. Upon release of the pressurized liquid within the hose, the hose will automatically contract to a contracted condition. The hose includes an inner tube made from an elastic material and an outer tube made from a non-elastic material. The inner tube is positioned concentrically within the outer tube in both a contracted condition and an expanded condition. The outer tube is secured to the inner tube only at a first end of the inner and outer tubes and at a second end of the inner and outer tubes. The outer tube moves laterally and longitudinally with respect to the inner tube when the tubes are transitioning between a contracted condition and an expanded condition.

20 Claims, 3 Drawing Sheets

Related U.S. Application Data is a division of application No. 15/055,095, filed on Feb. 26, 2016, now Pat. No. 9,581,272, which is a continuation of application No. 14/301,825, filed on Jun. 11, 2014, now Pat. No. 9,279,525, which is a continuation of application No. 13/859,511, filed on Apr. 9, 2013, now Pat. No. 8,757,213, which is a continuation-in-part of application No. 13/690,670, filed on Nov. 30, 2012, now Pat. No. 8,479,776, which is a continuation-in-part of application No. 13/654,832, filed on Oct. 18, 2012, now abandoned, which is a continuation-in-part of application No. 13/488,515, filed on Jun. 5, 2012, now Pat. No. 8,291,942, which is a continuation-in-part of application No. 13/289,447, filed on Nov. 4, 2011, now Pat. No. 8,291,941.

(51) Int. Cl.
*F16L 33/01* (2006.01)
*F16L 11/00* (2006.01)

(58) Field of Classification Search
USPC ......... 138/118, 119, 109, 125; 239/195, 281
See application file for complete search history.

(56) References Cited

U.S. PATENT DOCUMENTS

| | | |
|---|---|---|
| 79,220 A | 6/1868 | Forsyth et al. |
| 126,069 A | 4/1872 | McBurney |
| 411,829 A | 10/1889 | Nachtrieb |
| 543,220 A | 7/1895 | Ross |
| 674,045 A | 5/1901 | Sullivan |
| 834,074 A | 10/1906 | Patterson |
| 919,444 A | 4/1909 | Loetzer |
| 935,086 A | 9/1909 | Baird |
| 989,534 A | 4/1911 | MacDuffee |
| 1,179,374 A | 4/1916 | Many |
| 1,220,661 A | 3/1917 | Many |
| 1,288,148 A | 12/1918 | Oden |
| 1,301,354 A | 4/1919 | Baird |
| 1,756,698 A | 4/1930 | Oden |
| 1,993,617 A | 3/1935 | Nason |
| 2,076,632 A | 4/1937 | Goodall |
| 2,097,862 A | 11/1937 | McKay |
| 2,102,010 A | 12/1937 | Kopp |
| 2,464,416 A | 3/1949 | Raybould |
| 2,467,520 A | 4/1949 | Brubaker |
| 2,470,538 A | 5/1949 | Wolfram et al. |
| 2,475,591 A | 7/1949 | Chernack |
| 2,634,071 A | 4/1953 | Lund |
| 2,814,529 A | 11/1957 | Amt |
| 2,841,529 A | 7/1958 | Schmidt et al. |
| 2,858,854 A | 11/1958 | Daggett |
| 2,922,667 A | 1/1960 | Lanciano |
| 2,978,262 A | 4/1961 | Franck |
| 3,035,779 A | 5/1962 | Convis |
| 3,056,429 A | 10/1962 | Wilberg |
| 3,073,301 A | 1/1963 | Hay et al. |
| 3,205,913 A | 9/1965 | Ehlers |
| D206,236 S | 11/1966 | Seckel et al. |
| 3,315,674 A | 4/1967 | Bloom et al. |
| D215,002 S | 8/1969 | Bauman |
| 3,481,368 A | 12/1969 | Vansickle et al. |
| 3,520,725 A | 7/1970 | Hamrick |
| 3,524,779 A | 8/1970 | Masters et al. |
| 3,530,900 A | 9/1970 | Kish |
| 3,682,202 A | 8/1972 | Buhrmann et al. |
| 3,726,321 A | 4/1973 | Phillips et al. |
| 3,830,531 A | 8/1974 | Burge |
| 3,831,635 A | 8/1974 | Burton |
| 3,856,051 A | 12/1974 | Bain |
| 3,861,424 A | 1/1975 | Mizutani |
| 3,886,029 A | 5/1975 | Poulsen |
| 3,928,979 A | 12/1975 | Terashima et al. |
| 3,966,121 A | 6/1976 | Littman |
| 3,980,325 A | 9/1976 | Robertson |
| 4,009,734 A | 3/1977 | Sullivan |
| 4,081,302 A | 3/1978 | Drostholm et al. |
| RE29,613 E | 4/1978 | Kropfhammer |
| 4,091,063 A | 5/1978 | Logan |
| 4,111,237 A | 9/1978 | Mutzner et al. |
| 4,140,154 A | 2/1979 | Kanao |
| 4,154,237 A | 5/1979 | Courter |
| 4,159,027 A | 6/1979 | Caillet |
| 4,276,908 A | 7/1981 | Horne |
| 4,308,896 A | 1/1982 | Davis |
| 4,385,629 A | 5/1983 | Wolf, Jr. et al. |
| 4,394,861 A | 7/1983 | Sciortino |
| 4,404,969 A | 9/1983 | Cresswell et al. |
| 4,445,543 A | 5/1984 | Mead |
| 4,467,837 A | 8/1984 | Baker |
| 4,478,661 A | 10/1984 | Lewis |
| 4,553,568 A | 11/1985 | Piccoli et al. |
| 4,643,229 A | 2/1987 | Hickin |
| 4,657,049 A | 4/1987 | Fourty et al. |
| 4,669,757 A | 6/1987 | Bartholomew |
| 4,683,917 A | 8/1987 | Bartholomew |
| 4,736,969 A | 4/1988 | Fouts |
| 4,794,912 A | 1/1989 | Lia |
| 4,805,942 A | 2/1989 | Goodridge |
| 4,844,000 A | 7/1989 | Clement |
| 4,895,185 A | 1/1990 | Champleboux et al. |
| 4,895,189 A | 1/1990 | Alemanni |
| 4,915,106 A | 4/1990 | Aulgur et al. |
| 4,989,643 A | 2/1991 | Walton et al. |
| 5,023,959 A | 6/1991 | Mercer |
| 5,036,890 A | 8/1991 | Whaley |
| 5,112,087 A | 5/1992 | Haruki |
| 5,148,836 A | 9/1992 | Lawrence |
| 5,158,005 A | 10/1992 | Negishi et al. |
| 5,246,254 A | 9/1993 | LoJacono, Jr. et al. |
| 5,264,262 A | 11/1993 | Igarashi |
| 5,286,068 A | 2/1994 | Wiebe |
| 5,316,348 A | 5/1994 | Franklin |
| 5,477,888 A | 12/1995 | Mezzalira |
| 5,538,513 A | 7/1996 | Okajima |
| 5,555,915 A | 9/1996 | Kanao |
| 5,558,375 A | 9/1996 | Newman |
| 5,607,107 A | 3/1997 | Grieve et al. |
| 5,664,566 A | 9/1997 | McDonald et al. |
| 5,816,622 A | 10/1998 | Carter |
| 5,894,866 A | 4/1999 | Horst et al. |
| 5,915,735 A | 6/1999 | Noble |
| 5,918,642 A | 7/1999 | Akedo et al. |
| 5,947,116 A | 9/1999 | Gamow et al. |
| 5,954,052 A | 9/1999 | McDonald et al. |
| 5,957,132 A | 9/1999 | McDonald et al. |
| 6,024,132 A | 2/2000 | Fujimoto |
| 6,024,134 A | 2/2000 | Akedo et al. |
| 6,065,944 A | 5/2000 | Cobb |
| 6,070,580 A | 6/2000 | McDonald et al. |
| 6,098,666 A | 8/2000 | Wells et al. |
| 6,103,971 A | 8/2000 | Sato et al. |
| 6,192,940 B1 | 2/2001 | Koma et al. |
| 6,202,263 B1 | 3/2001 | Harker |
| 6,209,800 B1 | 4/2001 | Thomas |
| 6,223,777 B1 | 5/2001 | Smith et al. |
| 6,305,428 B1 | 10/2001 | Nakamura et al. |
| 6,408,848 B1 | 6/2002 | Feldman et al. |
| 6,443,155 B1 | 9/2002 | McDonald et al. |
| 6,446,661 B2 | 9/2002 | Armenia et al. |
| 6,523,539 B2 * | 2/2003 | McDonald ............... A62B 7/14 128/205.25 |
| 6,568,610 B1 | 5/2003 | Ericksen |
| 6,659,366 B1 | 12/2003 | Walters |
| D485,744 S | 1/2004 | Khubani |
| 6,672,307 B2 | 1/2004 | McDonald et al. |
| 6,698,457 B2 | 3/2004 | Hayashi et al. |
| 6,749,233 B2 | 6/2004 | Ohya |
| 6,769,452 B2 | 8/2004 | Qutub et al. |
| 6,787,491 B2 | 9/2004 | Braekevelt |

(56) References Cited

U.S. PATENT DOCUMENTS

| | | | |
|---|---|---|---|
| 6,948,527 | B2 | 9/2005 | Ragner et al. |
| 6,955,189 | B1 | 10/2005 | Weyker |
| 6,983,757 | B1 | 1/2006 | Becker et al. |
| 6,983,767 | B2 * | 1/2006 | Rickards ............... F16L 57/00 138/104 |
| 7,021,339 | B2 | 4/2006 | Hagiwara et al. |
| 7,178,526 | B2 | 2/2007 | McDonald et al. |
| D552,720 | S | 10/2007 | Salatino et al. |
| 7,302,972 | B1 | 12/2007 | Stowe |
| 7,306,012 | B2 | 12/2007 | Stockton et al. |
| D586,435 | S | 2/2009 | Reckseen |
| 7,549,448 | B2 | 6/2009 | Ragner |
| 7,617,762 | B1 | 11/2009 | Ragner |
| D605,737 | S | 12/2009 | von Glanstaetten et al. |
| 7,640,620 | B2 | 1/2010 | Stockton |
| 7,735,523 | B2 | 6/2010 | Smith et al. |
| 7,794,374 | B1 | 9/2010 | Park |
| 8,056,584 | B2 | 11/2011 | Burrowes et al. |
| 8,151,796 | B2 | 4/2012 | McDonald et al. |
| 8,291,941 | B1 | 10/2012 | Berardi |
| 8,291,942 | B2 | 10/2012 | Berardi |
| 8,479,776 | B2 | 7/2013 | Berardi |
| 8,757,213 | B2 | 6/2014 | Berardi |
| 8,776,836 | B2 | 7/2014 | Ragner et al. |
| 9,279,525 | B2 | 3/2016 | Berardi |
| 9,581,272 | B2 | 2/2017 | Berardi |
| 2002/0013974 | A1 | 2/2002 | Gibson et al. |
| 2003/0000530 | A1 | 1/2003 | McDonald et al. |
| 2003/0094207 | A1 | 5/2003 | Qutub et al. |
| 2003/0098084 | A1 | 5/2003 | Ragner et al. |
| 2004/0194781 | A1 | 10/2004 | Fukunaga et al. |
| 2004/0231096 | A1 | 11/2004 | Battle et al. |
| 2005/0246855 | A1 | 11/2005 | Stockton et al. |
| 2009/0277525 | A1 | 11/2009 | Jourdan |
| 2009/0301593 | A1 | 12/2009 | Zucchi et al. |
| 2010/0071795 | A1 | 3/2010 | Montalvo et al. |
| 2010/0089479 | A1 | 4/2010 | Smith et al. |
| 2012/0210752 | A1 | 8/2012 | Ragner |
| 2012/0234425 | A1 | 9/2012 | Berardi |
| 2013/0087205 | A1 | 4/2013 | Berardi |
| 2013/0113205 | A1 | 5/2013 | Berardi |
| 2014/0130930 | A1 | 5/2014 | Ragner |
| 2014/0230945 | A1 | 8/2014 | Ragner |

FOREIGN PATENT DOCUMENTS

| | | |
|---|---|---|
| CN | 2428670 Y | 5/2001 |
| CN | 2435609 Y | 6/2001 |
| CN | 202132621 U | 2/2012 |
| CN | 202228809 U | 5/2012 |
| CN | 202442051 U | 9/2012 |
| DE | 19542665 | 5/1997 |
| DE | 19752008 | 5/1999 |
| EP | 0039744 | 11/1981 |
| EP | 0214835 | 3/1987 |
| EP | 1176352 | 1/2002 |
| EP | 1271033 | 8/2004 |
| EP | 2395270 | 12/2011 |
| FR | 2582077 | 11/1986 |
| JP | 09112774 | 5/1997 |
| JP | 09217877 | 8/1997 |
| JP | 3059801 | 7/1999 |
| JP | D1104985 | 4/2001 |
| JP | 2001193882 | 7/2001 |
| JP | 2004069031 | 3/2004 |
| JP | 3180336 | 12/2012 |
| JP | 3181596 | 2/2013 |
| JP | 3183172 | 4/2013 |
| KR | 300301587 | 7/2002 |
| KR | 3020020000293 | 7/2002 |
| WO | WO9002582 | 3/1990 |
| WO | WO03010459 | 2/2003 |
| WO | WODM062658 | 3/2003 |

OTHER PUBLICATIONS

Anonymous, "Stroops Slastix Loop for Elastic Resistance Training and Leg Strengthening", YouTube Internet video product demonstration, URL: https://www.youtube.com/watch?v=LcsaX7CE1gg, (retrieved Nov. 25, 2013).

Anonymous, "Stroops slastix loop", Amazon.de, product, URL: http://www.amazon.de/s/ref=nb_sb_noss?__mk_de_DE=%C3%85M%C3%85%C5%BD%C3%95%C3%91&url=search-alias%3Daps&field-keywords=stroops%20slastix%20loop, (retrieved Nov. 25, 2013).

Anonymous, "Stroops slastix anneau de stroops", Amazon.fr, product, URL: http://www.amazon.fr/s/ref=nb_sb_noss?__mk_fr_FR=%C3%85M%C3%85%C5%BD%C3%95%C3%91&url=search-alias%3Daps&field-keywords=stroops%20slastix%20anneau, (retrieved Nov. 25, 2013).

Anonymous, "Stroops slastix loop", Amazon.co.uk, product, URL: http://www.amazon.co.uk/s/ref=nb_sb_noss?url=search-alias%3Daps&field-keywords=stroops%20slastix%20loop, (retrieved Nov. 25, 2013).

Anonymous, "Cuff performance in Taiwan", Internet article, URL: http://www.cuffperformance.com/2010/01/cuff-performance-in-taiwan/, (Mar. 12, 2013 screen capture).

Anonymous, "Stroops Slastix toner", Amazon.fr, product, URL: http://www.amazon.fr/Stroops-Slastix-Toner-Jaune-clair/dp/B002ZCXP1W/ref=sr_1_sc_1?ie=UTF8&qid=1385401458&sr=8-1-spell&keywords=stroops+slastix+toner+jauneclair, (retrieved Nov. 25, 2013).

Anonymous, "Stroops slastix toner", Amazon.co.uk, product, URL: http://www.amazon.co.uk/Stroops-Slastix-Toner-Medium-Red/dp/B002ZCXP1W/ref=sr_1_1?ie=UTF8&qid=1385401730&sr=8-1&keywords=stroops+slastix+toner, (retrieved Nov. 25, 2013).

Anonymous, "Vitor Belfort using Stroops Toner with Fit Stik", YouTube Internet video product demonstration, URL: https://www.youtube.com/watch?v=LMp2LWOjwmM, (Jul. 17, 2010).

Anonymous, "Stroops Battle Ropes—MMA training and strength building", YouTube Internet video product demonstration, URL: https://www.youtube.com/watch?v=Ggclk7Hvu0g, (Oct. 12, 2011).

Anonymous, "Slastix by Stroops", YouTube Internet video product demonstration, URL: https://www.youtube.com/watch?v=d6cJYFpWOkM, (Sep. 7, 2011).

Anonymous, "Stroops slastix toner", Amazon.de, product, URL: https://www.youtube.com/watch?v=d6cJYFpWOkM, retrieved Nov. 25, 2013).

Theresa, "Stroops the cat exercise device", Internet product review, URL: http://best-aerobic-exercises.blogspot.com/2011/06/stroops-cat-exercise-device.html, (Jun. 8, 2011).

Anonymous, "Stroops cat noir", Amazon.fr, product, URL: http://www.amazon.fr/Stroops-970099-Cat-Noir/dp/B002ZCXPJ4/ref=sr_1_1?ie=UTF8&qid=1385405677&sr=8-1&keywords=stroops+cat+noir (retrieved Nov. 25, 2013).

Anonymous, "Stroops cat, schwarz", Amazon.de, product, URL: http://www.amazon.de/Stroops-970099-Cat-Noir/dp/B002ZCXPJ4/ref=sr_1_1?ie=UTF8&qid=1385405677&sr=8-1&keywords=stroops+cat+noir, (retrieved Nov. 25, 2013).

Anonymous, "Stroops—Cat, Fasce per resistenza, colore: Nero", Amazon.it, product, URL: http://www.amazon.it/Stroops-970099-Cat-Noir/dp/B002ZCXPJ4/ref=sr_1_1?ie=UTF8&qid=1385405677&sr=8-1&keywords=stroops+cat+noir, (retrieved Nov. 25, 2013).

Anonymous, "Stroops MMA 50-0023 Anaconda Équipement de résistance fitness Orange 35 kg", Amazon.fr, product, URL: http://www.amazon.fr/s/ref=nb_sb_noss?__mk_fr_FR=%C3%85M%C3%85%C5%BD%C3%95%C3%91&url=search-alias%3Daps&field-keywords=stroops%20mma%2050-0023, (retrieved Nov. 25, 2013).

Anonymous, "Stroops MMA fitnessgerat anaconda", Amazon.de, product, URL: http://www.amazon.de/Stroops-MMA-Fitnessger%C3%A4t-Anaconda-50-0023/dp/B005LUP6PS/ref=sr_1_sc_1?ie=UTF8&qid=1385406392&sr=8-1-spell&keywords=stroops+mma+fitnessgerat+anaconda, (retrieved Nov. 25, 2013).

(56) References Cited

OTHER PUBLICATIONS

Anonymous, "The perfect garden hose", JGB Enterprises, Inc., Internet Article, http://www.jgbhose.com/PGH/news-reviews-testimonials/Does-Tuff-Guard-Hose-Really-Work.html., (retrieved Oct. 15, 2013).
Anonymous, "QVC to air Tuff Guard's the perfect garden hose during their march 2012 spring in bloom garden special series!", JGB Enterprises, Inc., Internet Article, http://www.jgbhose.com/JGB-news/QVC-to-Air-TUFF-GUARDs-The-Perfect-Garden-Hose.asp. (retrieved Oct. 15, 2013).
Anonymous, "Slastix toner exercise tubing with safety sleeve", Power Systems, Inc., Internet Article, http://www.power-systems.com/p-2030-slastix-toner-resistance-tubing.aspx., (retrieved Oct. 15, 2013).
Telebrands Contentions, Civil Action No. 12-06671-FSH-JBC, U.S. District Court, District of New Jersey, Telebrands Corp.'s Invalidity Contentions Pursuant to local patent rule 3.3, (Jan. 20, 2014).
Exhibit A 941 McDonald, Telebrand Contentions, Civil Action No. 12-06671-FSH-JBC, U.S. District Court, District of New Jersey, Telebrands Corp.'s Invalidity Contentions Pursuant to local patent rule 3.3, (Jan. 20, 2014).
Exhibit B 941 Many, Telebrand Contentions, Civil Action No. 12-06671-FSH-JBC, U.S. District Court, District of New Jersey, Telebrands Corp.'s Invalidity Contentions Pursuant to local patent rule 3.3, (Jan. 20, 2014).
Exhibit C 942 McDonald, Telebrand Contentions, Civil Action No. 12-06671-FSH-JBC, U.S. District Court, District of New Jersey, Telebrands Corp.'s Invalidity Contentions Pursuant to local patent rule 3.3, (Jan. 20, 2014).
Exhibit D 942 Many, Telebrand Contentions, Civil Action No. 12-06671-FSH-JBC, U.S. District Court, District of New Jersey, Telebrands Corp.'s Invalidity Contentions Pursuant to local patent rule 3.3, (Jan. 20, 2014).
Exhibit E 776 McDonald, Telebrand Contentions, Civil Action No. 12-06671-FSH-JBC, U.S. District Court, District of New Jersey, Telebrands Corp.'s Invalidity Contentions Pursuant to local patent rule 3.3, (Jan. 20, 2014).
Exhibit F 776 Many, Telebrand Contentions, Civil Action No. 12-06671-FSH-JBC, U.S. District Court, District of New Jersey, Telebrands Corp.'s Invalidity Contentions Pursuant to local patent rule 3.3, (Jan. 20, 2014).
Exhibit G 941 McDonald, Telebrand Contentions, Civil Action No. 12-06671-FSH-JBC, U.S. District Court, District of New Jersey, Telebrands Corp.'s Invalidity Contentions Pursuant to local patent rule 3.3, (Jan. 20, 2014).
Exhibit H 941 Ragner, Telebrand Contentions, Civil Action No. 12-06671-FSH-JBC, U.S. District Court, District of Jew Jersey, Telebrands Corp.'s Invalidity Contentions Pursuant to local patent rule 3.3, (Jan. 20, 2014).
Exhibit I 941 Definition of Hose, Telebrand Contentions, Civil Action No. 12-06671-FSH-JBC, U.S. District court, District of New Jersey, Telebrands Corp.'s Invalidity Contentions Pursuant to local patent rule 3.3, (Jan. 20, 2014).
Exhibit J 942 McDonald, Telebrand Contentions, Civil Action No. 12-06671-FSH-JBC, U.S. District Court, District of New Jersey, Telebrands Corp.'s Invalidity Contentions Pursuant to local patent rule 3.3, (Jan. 20, 2014).
Exhibit K 942 Ragner, Telebrand Contentions, Civil Action No. 12-06671-FSH-JBC, U.S. District Court, District of Jew Jersey, Telebrands Corp.'s Invalidity Contentions Pursuant to local patent rule 3.3, (Jan. 20, 2014).
Exhibit L Definition of Hose, Telebrand Contentions, Civil Action No. 12-06671-FSH-JBC, U.S. District Court, District of New Jersey, Telebrands Corp.'s Invalidity Contentions Pursuant to local patent rule 3.3, (Jan. 20, 2014).
Exhibit M 776 McDonald, Telebrand Contentions, Civil Action No. 12-06671-FSH-JBC, U.S. District Court, District of New Jersey, Telebrands Corp.'s Invalidity Contentions Pursuant to local patent rule 3.3, (Jan. 20, 2014).
Exhibit N 776 Ragner, Telebrand Contentions, Civil Action No. 12-06671-FSH-JBC, U.S. District Court, District of Jew Jersey, Telebrands Corp.'s Invalidity Contentions Pursuant to local patent rule 3.3, (Jan. 20, 2014).
Exhibit O 776 Definition of Hose, Telebrand Contentions, Civil Action No. 12-06671-FSH-JBC, U.S. District court, District of New Jersey, Telebrands Corp.'s Invalidity Contentions Pursuant to local patent rule 3.3, (Jan. 20, 2014).
Exhibit P List of Prior Art, Telebrand Contentions, Civil Action No. 12-06671-FSH-JBC, U.S. District Court, District of New Jersey, Telebrands Corp.'s Invalidity Contentions Pursuant to local patent rule 3.3, (Jan. 20, 2014).
Tristar Contentions, Civil Action No. 2:13-CV-07099-FSH-JBC, U.S. District Court, District of New Jersey, Tristar Products, Inc.'s invalidity contentions pursuant to local patent rule 3.3, (Jan. 20, 2014).
Exhibit A, Tristar Contentions, Civil Action No. 2:13-CV-07099-FSH-JBC, U.S. District Court, District of New Jersey, Tristar Products, Inc.'s invalidity contentions pursuant to local patent rule 3.3, (Jan. 20, 2014).
Exhibit B, Tristar Contentions, Civil Action No. 2:13-CV-07099-FSH-JBC, U.S. District Court, District of New Jersey, Tristar Products, Inc.'s invalidity contentions pursuant to local patent rule 3.3, (Jan. 20, 2014).
Exhibit C, Tristar Contentions, Civil Action No. 2:13-CV-07099-FSH-JBC, U.S. District Court, District of New Jersey, Tristar Products, Inc.'s invalidity contentions pursuant to local patent rule 3.3, (Jan. 20, 2014).
Exhibit D, Tristar Contentions, Civil Action No. 2:13-CV-07099-FSH-JBC, U.S. District Court, District of New Jersey, Tristar Products, Inc.'s invalidity contentions pursuant to local patent rule 3.3, (Jan. 20, 2014).
Exhibit E, Tristar Contentions, Civil Action No. 2:13-CV-07099-FSH-JBC, U.S. District Court, District of New Jersey, Tristar Products, Inc.'s invalidity contentions pursuant to local patent rule 3.3, (Jan. 20, 2014).
Exhibit F, Tristar Contentions, Civil Action No. 2:13-CV-07099-FSH-JBC, U.S. District Court, District of New Jersey, Tristar Products, Inc.'s invalidity contentions pursuant to local patent rule 3.3, (Jan. 20, 2014).
Exhibit G, Tristar Contentions, Civil Action No. 2:13-CV-07099-FSH-JBC, U.S. District Court, District of New Jersey, Tristar Products, Inc.'s invalidity contentions pursuant to local patent rule 3.3, (Jan. 20, 2014).
Exhibit H, Tristar Contentions, Civil Action No. 2:13-CV-07099-FSH-JBC, U.S. District Court, District of New Jersey, Tristar Products, Inc.'s invalidity contentions pursuant to local patent rule 3.3, (Jan. 20, 2014).
*Blue Gentian, LLC and National Express, Inc.* v. *Tristar Products, Inc.*, Civil Action No. 13-1758 (FSH) (JBC), Third amended complaint for patent infringement, (Nov. 19, 2014).
*E. Mishan & Sons, Inc. and Blue Gentian, LLC* v. *Supertek Canada Inc., International Edge , Inc. and Telebrands Corp.*, Citation No. 2014 FC 326, Federal Court, Toronto, Ontario, (Apr. 7, 2014).
*Blue Gentian LLC and Brand Developers Aust Pty Ltd* (ACN 115 139 565) v. *Product Management Group Pty Ltd* (ACN 131 987 034); *Product Management Group Pty Ltd* (ACN 131 987 034); *Blue Gentian LLC and Brand Developers Aust Pty Ltd* (ACN 115 139 565), Citation: *Blue Gentian LLC* v *Product Management Group Pty Ltd* [2014] FCA 1331, File No. 317 of 1331, Federal Court of Australia, (Dec. 8, 2014).
*Blue Gentian LLC and E. Mishan & Sons, Inc. Trading as Emson* v. *Tristar Products (UK) Limited and Tristar Products Inc.*, Neutral Citation No. [2013] EWHC 4098 (Pat), Case No. HP13E03325, In the High Court of Justice Chancery Division patents court, Royal Courts of Justice, London, England, (Dec. 20, 2013).
Reply to Exam Report dated Mar. 13, 2014, Wilson Gunn Assoc, EP Application No. 12275110.0, Expandable Hose Assembly, Submission No. 2811600, European Patent Office, (Jun. 9, 2014).
*Blue Gentian, LLC and National Express, Inc.* v. *Wal-Mart Stores, Inc., The Walgreen Company, Family Dollar Stores, Inc., and HSN,*

(56) References Cited

OTHER PUBLICATIONS

*Inc.*, Amended Complaint for Patent Infringement, Civil Action No. 13-4627 (FSH) (JBC), U.S. District Court of New Jersey, (Nov. 19, 2014).

*Blue Gentian, LLC and National Express, Inc. v. Wal-Mart Stores, Inc., d/b/a Sam's Club and Sam's Wholesale Club*, Second Amended Complaint for Patent Infringement, Civil Action No. 13-7099 (FSH) (JBC), U.S. District Court of New Jersey, (Nov. 19, 2014).

*Telebrands Corp. v. Blue Gentian, LLC and National Express, Inc.*, Second Amended Complaint, Civil Action No. 2:12-CV-06671-FSH-JBC, U.S. District Court of New Jersey, (Nov. 26, 2014).

Notice of Pending Litigation, Commercial Hose, McHale & Slavin, P.A.

ID146676 Blue Gentian, Expandable Hose Assembly, Canada.

Anonymous, "Dust Right Expandable Hose", Internet Article One, http://www.rockler.com/product.cfm?page=21316, Rockler Woodworking Tools, (retrieved Apr. 10, 2013).

Anonymous, "Dust Right Expandable Hose", Internet Article Two, http://www.rockler.com/product.cfm?page=21316, Rockler Woodworking Tools, (retrieved May 15, 2013).

Anonymous, "Elastic resistance training system in the UG store", Mixed martial arts forum, product, URL: http://www.mixedmartialarts.com?go=forum.posts&thread=1980399&forum=1, (Apr. 2, 2012).

Anonymous, "Gardena 8677-20 comfort-schlauch 13mm-½, 30 meter", Amazon.de, product, URL: http:www.amazon.de/Gardena-8677-20-comfort-schlauch-13-meter/dp/B000OY07WS, (retrieved Nov. 20, 2013).

Anonymous, "Garden Hose", Wikipedia.org, URL: http://simple.wikipedia.org/wiki/File:Garden_hose.jpg, (retrieved Nov. 20, 2013).

Liszewski, A., "Pirit heated hose", Internet article: URL: http://www.ohgizmo.com/?s=heated+hose, (retrieved Nov. 20, 2013).

Anonymous, "Gardena 1969-20 perl-regner 15,0 m mit armaturen", Amazon.de, product, URL: http://www.amazon.de/gardena-1969-20-Perl-Regner-mit-Armaturen/dp/Booo1E3TB2/ref=sr_1_25?s=garden&ie=UTF8&qid=1362765470&sr=1-25, (retrieved Mar. 12, 2013).

Gannon, M., "Hose protection", Hydraulics & pneumatics, Internet article, URL: http://hydraulicspneumatics.com/products/hose-protection, (retrieved Nov. 22, 2013).

Anonymous, "Gaiam covered medium resistance workout kit", YouTube Internet video product demonstration, URL: http://youtube.com/watch?v=FeOkHbcXbA4, (retrieved Nov. 25, 2013).

Anonymous, "Covered resistance cord kit—light", Barnes & Noble, product, URL: http://www.barnesandnoble.com/w/dvd-covered-resistance-cord-kit-medium/14973179?ean=18713528650, (retrieved Nov. 25, 2013).

Anonymous, "Covered resistance cord kit—light DVD", Amazon.co.uk, product, URL: http://www.amazon.co.uk/Covered-Resistance-Cord-Kit-Region/dp/B0015RDJZ0/ref=sr_1_3?ie=UTF8&qid=1385416290&sr=8-3&keywords=covered+resistance+cord+kit, (retrieved Nov. 25, 2013).

Roberts, A., "Gaiam covered resistance cord kit with DVD", Fitsugar.com, product, URL: http:www.fitsugar.com/Gaiam-resistance-cord-review-20378682, (Nov. 14, 2011).

Anonymous, "Gaiam TG05 covered resistance cord kit", Amazon.co.uk, product, URL: http://www.amazon.co.uk/Covered-Resistance-Cord-Kit-Region/dp/B0015RDJZ0/ref=sr_1_fkmr0_3?ie=UTF8&qid=1385415911&sr=8-3-fkmr0&keywords=gaiam+tg05+covered+resistance+cord+kit, (retrieved Nov. 25, 2013).

* cited by examiner

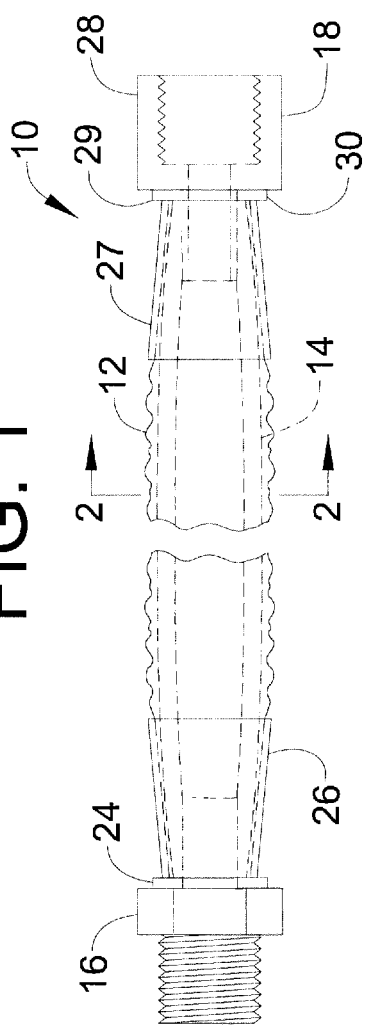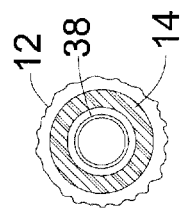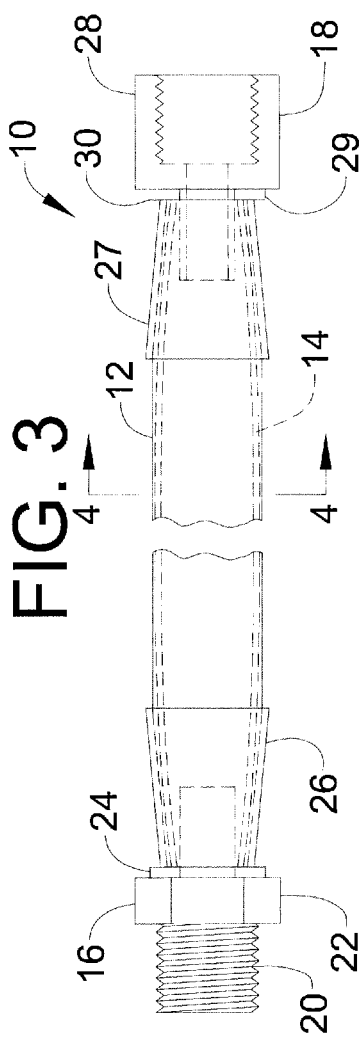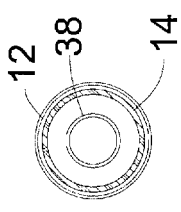

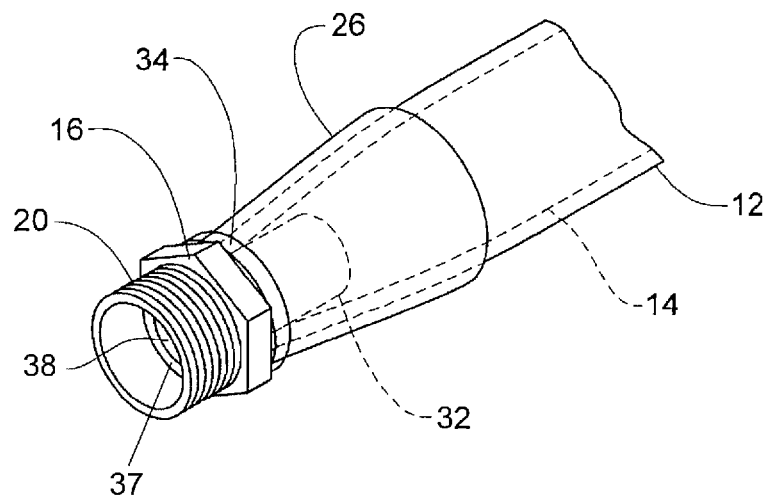
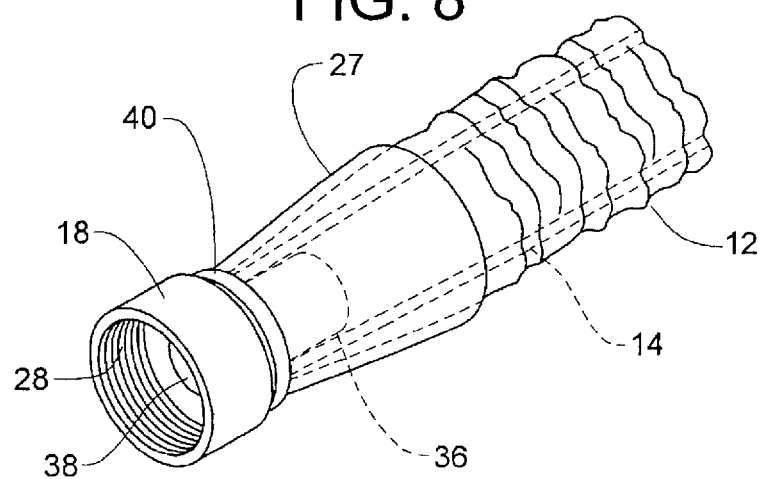

EXPANDABLE AND CONTRACTIBLE GARDEN HOSE

PRIORITY

In accordance with 37 C.F.R. 1.76, a claim of priority is including in an Application Data Sheet filed concurrently herewith. Accordingly, the present invention claims priority as a continuation of U.S. patent application Ser. No. 15/440,841 entitled "Garden Hose Device and Method" filed Feb. 23, 2017 which claims priority as a divisional of U.S. patent application Ser. No. 15/055,095 entitled "Commercial Hose" filed Feb. 26, 2016 and issued on Feb. 28, 2017 as U.S. Pat. No. 9,581,272 which claims priority as a continuation of U.S. patent application Ser. No. 14/301,825 entitled "Commercial Hose" filed Jun. 11, 2014 and issued on Mar. 8, 2016 as U.S. Pat. No. 9,279,525, which is a continuation of U.S. patent application Ser. No. 13/859,511, entitled "Commercial Hose", filed Apr. 9, 2013, and issued Jun. 24, 2014 as U.S. Pat. No. 8,757,213, which is a continuation-in-part of U.S. patent application Ser. No. 13/690,670, entitled "Expandable Garden Hose", filed Nov. 30, 2012, and issued on Jul. 9, 2013 at U.S. Pat. No. 8,479,776, which is a continuation-in-part of U.S. patent application Ser. No. 13/654,832, entitled "Expandable Hose Assembly Coupling Member", filed Oct. 18, 2012, and now abandoned, which is a continuation-in-part of U.S. patent application Ser. No. 13/488,515, entitled "Expandable Hose Assembly", filed Jun. 5, 2012, and issued Oct. 23, 2012 as U.S. Pat. No. 8,291,942, which is a continuation-in-part of U.S. patent application Ser. No. 13/289,447, entitled "Expandable and Contractible Hose", filed Nov. 4, 2011, and issued Oct. 23, 2012 as U.S. Pat. No. 8,291,941; the contents of the above referenced patents are incorporated herein by reference.

FIELD OF THE INVENTION

The present invention relates to a hose for carrying liquid materials. In particular, a hose that automatically contracts to a contracted state when there is no pressurized liquid within the hose and expands to an extended state when a pressurized liquid is introduced into the hose. In the contracted state the hose is relatively easy to store and easy to handle because of its relative short length and its relative light weight and in the extended state the hose can be located to where ever the liquid is required. The hose is comprised of an elastic inner tube and a separate and distinct non-elastic outer tube positioned around the circumference of the inner tube and attached and connected to the inner tube only at both ends and is separated, unattached unbonded and unconnected from the inner tube along the entire length of the hose between the first end and the second end.

BACKGROUND OF THE INVENTION

Hoses which are used to carry various liquids are known in the art. One of the problems encountered with these hoses is storage of the hose when it is not being used to transport the liquids. While current hoses are flexible and can be wrapped around a cylinder or drum for storage and transport, the length and width of the hose cannot be reduced. Another problem encountered with wrapped or coiled hoses is that they tend to kink when unwrapped or uncoiled. This problem is usually encountered by the average homeowner when using a garden hose to water their grass, plants, or wash their vehicles.

Firefighters have a solution to the kinking problem. The hoses that they use collapse into a relatively flat state when the liquids are removed from the hoses. The hoses are then stored in layers which are formed by the hose being laid back and forth upon itself. When the firefighters use the hoses stored like this, they only have to pull at one end of the hose and it unfolds in a straight line without kinking. This is not a practical solution to a homeowner's problem of hose storage because gardens hoses are relatively small in diameter, compared to fire hoses, and almost all garden hoses do not collapse into a flat condition when the water is emptied from the hose.

Another problem with hoses known in the art is that they are heavy bulky and difficult to unravel when lying on the ground and also difficult to handle and drag around to the place where the liquid is needed both when they are filled with a liquid and equally as difficult to handle and drag around when they are empty and needing to be returned to there original place of storage. Also, if the user does not have a device for winding the hose then he must try to place the hose on the ground in a way as to not entangle the hose within itself because if the hose does become entangled within itself this makes it difficult and frustrating to unravel the hose the next time the hose is used.

Therefore, what is needed in the art is a hose that can be expanded and extended to a practical length during use, and automatically returned to the reduced length when not in use. Also, a hose which is relatively light in weight and will not kink when taken from storage and filled with liquid for use.

DESCRIPTION OF THE PRIOR ART

R. H. Vansickle et al., U.S. Pat. No. 3,481,368 discloses a flexible hose comprising an elastomer liner tube surrounded by a plurality of layers of metallic wire reinforcement and an external cover, the inner reinforcing 15 layer comprising a single thickness of helically wound wires interlaced by textile yarns with the wires lying in a smooth cylindrical configuration and all interlacing crimp being in the textile yarns. One or more additional reinforcing layers of wire are wound helically without 20 interlacing textile yarns and with an insulating layer of elastomer between each layer of reinforcement. A layer of braided wire may be provided over the other reinforcing layers and beneath the cover.

J. C. Hamrick, U.S. Pat. No. 3,520,725 discloses a vacuum cleaning system in which a pliable but flexurally rigid vacuum hose normally stored within a suction conduit has little or no stretchability when the hose is being moved to extended or retracted stored condition in the conduit to facilitate movement of the hose through bends in the conduit, and wherein a piston on the hose 20 is deformable so as to be moved past an abutment carried by an outlet receptacle on the outer end of the conduit, and wherein interengagement between the piston and the abutment otherwise limits extension or retraction of the hose, as the case may be, relative to the conduit.

Buhrmann et al., U.S. Pat. No. 3,682,202 discloses an improved collapse-resistant, reinforced hose of flexible polymeric material including a semi-rigid generally circumferentially disposed supporting structure which includes preferably a single layer of textile fabric reinforcement, the major portion of which is composed of treated polyester or nylon fibers. The polyester or nylon fibers are treated with an organic polyisocyanate and preferably a solution of at least 2 percent organic polyisocyanate in a non-reactive solvent.

The hose has substantially improved bursting strength and resistance to vacuum collapse without the need of additional support, such as a metal wire insert. The invention is particularly useful for flexible radiator hoses used in automotive vehicle cooling systems.

Sullivan, U.S. Pat. No. 4,009,734 discloses a flexible self-retracting coiled tubing having desirable recoil strength and elastic memory is described. The coiled tubing is adaptable especially as a self-retracting air tube for transmitting fluids under pressure to pneumatic equipment. The coiled tubing comprises an extruded seamless plastic tube prepared by extruding a mixture comprising a chemically extended polyester and from about 10% to about 50% of a polybutylene terephthalate polymer.

Logan, U.S. Pat. No. 4,091,063 discloses a molded hose construction and method of making same is provided wherein such hose construction has axially spaced convolutions and a controlled flexibility defined by alternating crests and troughs, and the hose construction has an elastomeric inner layer, an elastomeric outer layer, and an intermediate reinforcing layer made of a fabric material having a substantial open space between cooperating threads defining the fabric material; and the layers are bonded as a unitary structure by strike-through columns of elastomeric material extending through said substantial space with the alternating crests and troughs having a controlled wall thickness throughout which assures the controlled flexibility, and the crests and troughs having been formed with the elastomeric layers in a semi-cured condition to assure said controlled wall thickness thereof.

Home, U.S. Pat. No. 4,276,908 discloses a thermoplastic hose is disclosed in which a reinforcement layer is made from a combination of yarns and monofilaments to provide stereo interstices where mechanical bonds between the reinforcement and its adjacent element of the hose can be established.

Piccoli et al., U.S. Pat. No. 4,553,568 discloses a flexible hose adapted to regain its original shape after crushing due to a novel braided-spiral reinforcement layer containing one braid member which is a relatively stiff, uncrimped monofilament and a second braid member which is a flexible textile material crimped around the stiff monofilament at each contact point in the braided spiral layer. The braided spiral imparts improved crush and kink resistance to the hose structure. This hose is particularly useful as a gasoline pump dispensing hose which is subject to frequent crushing by vehicle wheels during service.

Champleboux, U.S. Pat. No. 4,895,185 discloses a device with flexible hose, particularly for an expandable packer, wherein hose is reinforced by armature layers made of flexible cables disposed helically and is attached at least at one end by compression of said layers against rigid pieces, characterized by the supporting elements and gripping elements, which are coaxial, having non-adhesive conical compression surfaces which diverge toward the end and by at least one wedge provided with slits being driven between reinforcing layers to ensure compression.

Walton et al., U.S. Pat. No. 4,989,643 discloses a high performance composite hose having enhanced durability, reliability and longevity for use in high pressure, high temperature and/or vibrational environments such as turbocharged truck, bus, automobile, marine and generating engines. The composite hose comprises one or more plies of balanced fabric having a high performance elastomer adhered to the inner and outer surfaces of each fabric ply.

Mercer, U.S. Pat. No. 5,023,959 discloses a system for extending and retracting the waste hose for a waste disposal system that is typically found on recreational vehicles and includes power or crank-driven hose extender means for extending the collapsible hose from its collapsed mode stored on-board the recreational vehicle, to its extended configuration which it is used for dumping waste from an RV holding tank into an inlet of an RV waste dump station.

Whaley, U.S. Pat. No. 5,036,890 discloses a device which may be inserted into the hydrant end of a conventional garden or water hose for the purpose of reinforcing that portion of the hose which is apt to be kinked or broken due to short bending of the hose at the hydrant end by tension imposed on the hose during use. The reinforcement device comprises a length of coiled resilient material having a resilient gasket mounted on one end thereof which may be inserted or removed from a hose at will.

LoJacono, Jr. et al., U.S. Pat. No. 5,246,254 discloses an anti-kinking device used in conjunction with a garden variety water hose, wherein the device includes a housing defined by a tubular body having a coupling member rotatably mounted to the tubular body so as to be connected to a water faucet, wherein the opposite end of the tubular body is threaded so as to connect to a garden-type hose, and further includes an elongated flexible nylon cable that is fixedly secured to a boss member formed in the internal wall of the tubular body, whereby the cable is formed with a length so as to be readily positioned within the full length of the hose.

Igarashi U.S. Pat. No. 5,264,262 discloses a refrigerant transporting hose having a laminar structure including an inner tube consisting of at least one layer, an outer tube disposed radially outwardly of and coaxially with the inner tube, and a reinforcing fiber layer interposed between the inner and outer tubes. The inner tube includes a resin layer formed of a resin composition.

Mezzalira, U.S. Pat. No. 5,477,888 discloses a hose (10) which comprises at least one tubular layer (3) of plastic or rubber material, a mesh-network (4) of the chain type presenting mesh lines (5) and mesh rows (6) having a tubular shape being wound on the external surface of said inner layer, a possible external layer (7), and is characterized in that said mesh rows are slanted in relation to the longitudinal axis of the hose. According to a preferred embodiment the lines (5) of said meshes are slanted in relation to the longitudinal axis Y of the hose, following a direction opposite to the direction of the mesh rows (6).

Kanao, U.S. Pat. No. 5,555,915 discloses a cleaner hose includes a hose body, connection cylinders to be connected to a cleaner operating pipe and a cleaner body, respectively, which are connected to ends of the hose body, respectively, and a reinforcement wire material wound in the hose body spirally and continuously over the whole length of hose body. The reinforcement wire material is shaped like a steeply slanted spiral in a predetermined length portion near one of or both of the ends of the hose body so that adjacent spiral portions of the reinforcement wire material are close to each other while a hose wall of the hose body is loosened toward the inner circumferential surface. On the other hand, the reinforcement wire material is shaped like a gently slanted spiral in an intermediate portion except the one of or both of the ends of the hose body so that adjacent spiral portions of the reinforcement wire material are separated from each other in the direction of a pipe axis.

Grieve et al., U.S. Pat. No. 5,607,107 discloses a retractable conduit formed from a sheet of memory-set polyester. To manufacture the memory-set strip, the polyester sheet is wound into a desired coiled position. It is then heated and cooled in a manner to memory-set the sheet in a coiled form.

After this process the sheet of polyester will automatically return to the coiled condition after it has been uncoiled. In one form, suitable as a splash block, the distal end of the polyester sheet is wider than the end attachable to a downspout. In another form the polyester sheet is sheathed in an elongated polyethylene tube, to form a retractable hose. In a preferred form, the distal end of the hose is supported on a spool which will roll along the ground as the hose is wound and unwound to further ensure that the hose retracts properly. The tube can also be provided with holes to act as a sprinkler if desired.

Carter, U.S. Pat. No. 5,816,622 discloses a protective sleeve for a garden hose includes a protective shell section having a generally tubular body with an inner bore shaped for receiving a coupling of the garden hose snugly therein. A flexible strain relief section is releasably attached to the shell section wherein the flexible strain relief section has a generally tubular body. A locking member of the strain relief section releasably attaches the strain relief section to the shell section. The locking member is receivable within an opening formed in the body of the shell section. The locking member is resiliently movable from a relaxed condition in which it extends through the opening and engages the body of the shell section for preventing axial movement of the strain relief section away from the shell section, to an inwardly flexed position in which the locking member flexes inwardly out of the opening and disengages the body of the shell section for allowing relative axial movement between the shell and strain relief sections. The strain relief section has an outer surface that defines a gripping surface for facilitating the attachment of the garden hose with another garden hose.

Horst et al., U.S. Pat. No. 5,894,866 discloses a garden hose assembly is provided and comprises holding means comprising at least a portion of such hose assembly with the holding means and portion being adapted to be coiled around an associated support for holding the portion at a desired position to enable use of the hose assembly in a hands-free manner.

Fujimoto, U.S. Pat. No. 6,024,132 discloses a flexible hose comprises a bellows hose wall 1 composed of an inner wall 2 and an outer wall 3 each made of a soft resin and a spiral hard reinforcement 4 interposed there between. As the hose contracts, a spiral groove 7 is formed inside of the hose. The inner wall 2 is not partially bonded or fused with the outer wall 3 and the hard spiral reinforcement 4 to form unbonded sites or fragments 8. As the hose contracts, the unbonded fragments 8 are separated from the outer wall 3 and the spiral hard enforcement 4 and move to the inward direction of the hose, and close the spiral groove 7. Therefore, even a fluid flows to any longitudinal direction, the flexible hose reduces a flow resistance.

Akedo et al., U.S. Pat. No. 6,024,134 discloses a laminated tape comprising a main layer of a polyester-series thermoplastic polyurethane resin and a covering layer formed of a soft vinyl chloride resin fused with at least one surface of the main layer is spirally wound, and its adjacent side edges are bonded each other to form a hose wall.

Wells et al., U.S. Pat. No. 6,098,666 discloses a tubing assembly for conveying fluid under pressure such as from a source of air pressure in a vehicle to an airbrake system of the vehicle. The assembly includes a flexible first and second tubing member, each having an outer surface and extending axially from a forward distal end to a rearward distal end.

Ericksen, U.S. Pat. No. 6,568,610 discloses a flexible water spray wand for connection to a standard garden hose, having a housing connectable at a lower end to the garden hose and at an upper end to a flexible tube assembly connected at an opposite end to a spray nozzle. The pistol grip housing includes a water flow control valve such as a trigger mechanism operatively connected to a water valve for controlling the flow of water from the nozzle of the wand.

Ragner et al., U.S. Pat. No. 6,948,527 discloses a linearly self-actuated hose for use in transporting fluids (liquids, gases, solid particles, and combinations of these three). Hoses (30) and (30b) have a biasing spring (36) extends along the full length, and can comprise single or multiple springs and/or multiple diameter spring coils. Spring (36) is covered with hose cover material (32) on the outside and hose cover material (34) on the inside to form a sealed hose and are bowed inward or outward radially between the individual spring coils depending on the intended use of hose (30) or (30b), respectfully to give the cover materials room to move out of the way when the hose retracts and the coils of spring (36) are forced close together.

Weyker, U.S. Pat. No. 6,955,189 discloses a garden hose assembly includes an elongated and flexible tubular member that includes an open first end, an open second end and a peripheral wall extending between the first and second open ends. A cross-section taken traversely to a longitudinal axis of the tubular member has a generally oblong shape when the tubular member is filled with a fluid and a substantially flattened shape when the tubular member is not filled with a fluid. The tubular member has an outer surface colored a fluorescent color. A threaded female coupler is fluidly coupled to the first end and a threaded male coupler is fluidly coupled to the second end.

Ragner, U.S. Pat. No. 7,549,448 discloses a linearly self-actuated hose for use in transporting fluids (liquids, gases, solid particles, and combinations of these three). Hose (30) has a biasing spring (36) that extends along its full length, and can comprise single or multiple springs and/or multiple diameter spring coils. Spring (36) is covered with hose cover material (32) on the outside and hose cover material (34) on the inside to form a sealed hose and are bowed inward or outward radially between the individual spring coils depending on the intended use of hose (30) to give the cover materials room to move out of the way when the hose retracts and the coils of spring (36) are forced close together.

Ragner et al., U.S. Pat. No. 8,776,836 discloses a hose (70) having a biasing spring (76) along the full length. Spring (76) is covered with the hose cover material (72) on the outside and hose support layer (74) and hose sealing layer (72) on the inside to form a sealed hose. The invention comprises the improvement of the hose body (layers (72), (74), and (75)) by defining the layers as bowed inwardly radially between the individual spring coils to create a helical indentation (74b) around hose (70). This helical indentation (74b) causes the hose body materials (layers (72), (74), and (75)) move inward radially when hose (70) is retracted and the coils of spring (76) are forced close together longitudinally. Thus, layers (72), (74), and (75) are folded substantially with spring (76) when retracted, greatly reducing the volume of the hose (70) in its retracted position and substantially protecting (72), (74) and (75) from damage by abrasion and puncture.

SUMMARY OF THE INVENTION

A hose which automatically expands longitudinally and automatically expands laterally upon the application of a pressurized liquid within the hose is disclosed. The hose can expand longitudinally up to six times its unexpanded or contracted length and can expand laterally up to six times its unexpanded width. Upon release of the pressurized liquid within the hose, the hose will automatically contract to a contracted condition. The hose includes an expandable inner tube made from an elastic material and a separate, distinct outer tube made from a non-elastic material, positioned around the outer circumference and length of the inner tube and secured to the inner tube only at the first and second end. The outer tube is unattached, unconnected, unbonded, and unsecured to the inner tube along the entire length of the inner tube, between the first end and the second end, so that the outer tube can move freely with respect to the inner tube along the entire length of the inner tube between the first end and the second end.

Accordingly, it is an objective of the present invention to provide a hose that expands longitudinally and expands laterally upon the application of a pressurized liquid within the hose.

It is a further objective of the present invention to provide a hose that automatically contracts upon release of a pressurized liquid within the hose. The contracted length being up to six times shorter that an expanded length.

It is yet another objective of the present invention to provide a hose that is relatively light compared to a non-expanding/non-contracting hose.

It is a still further objective of the present invention to provide a hose that will not kink or become entangled upon itself when in use.

It is a still further objective of the present invention to provide a hose including indicia, such as words, on an outer tube or sleeve.

It is a still further objective of the present invention to provide a hose that can be readily coupled and uncoupled to a source of water such as a faucet on a house.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

FIG. 1 is a longitudinal side view of the present invention in a contracted position;

FIG. 2 is a cross section view of the present invention taken along line 2-2 in FIG. 1;

FIG. 3 is a longitudinal view of the present invention in an expanded position;

FIG. 4 is a cross sectional view of the present invention taken along line 4-4 in FIG. 3;

FIG. 7 is a perspective view of a male coupler secured to an end of the hose of the present invention when the hose is in its extended condition; and FIG. 8 is a perspective view of a female coupler secured to an end of the hose of the present invention when the hose is in its contracted condition.

DETAILED DESCRIPTION OF THE INVENTION

Figure 5:
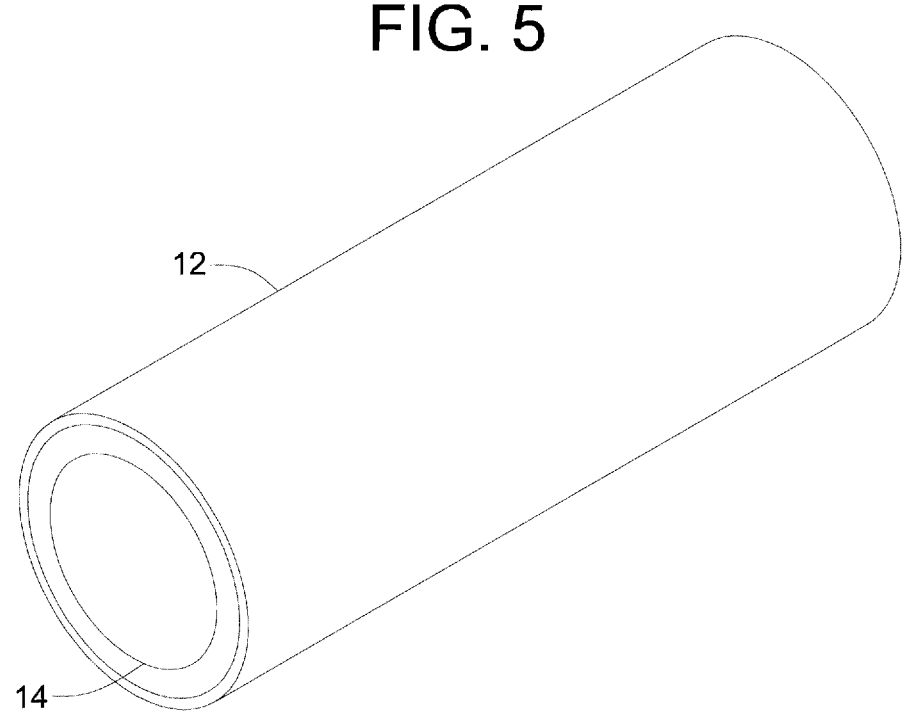
FIG. 5 is a cross sectional view, perspective view of a section of the hose of the present invention taken along line 4-4 in FIG. 3.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

FIGS. 1-8, which are now referenced, illustrate the present invention and the manner in which it is assembled. FIGS. 1 and 3 illustrate a preferred embodiment of the expandable and contractible hose of the present invention. The hose is self-expanding upon application of a pressurized liquid and increased fluid volume within the hose. The hose is also self-contracting upon release of the pressurized liquid and fluid volume from within the hose. The hose 10 is composed of two separate and distinct tubes 12 and 14. The inner tube 14 is formed from a material that is elastic with an elongation ratio of up to 6 to 1 and can expand up to 4 to 6 times its relaxed or unexpanded length when a pressurized liquid is introduced into the elastic inner tube 14. A preferred material for the inner tube 14 is natural latex rubber. However, other synthetic materials, which have elastic properties similar to natural latex rubber, specifically, the ability to automatically retract from a stretched or expanded state, can also be used. Upon application of pressurized liquid into the inner tube, the elastic inner tube 14 expands radially outwardly or laterally, with respect to its length, within the outer tube. The radial expansion of the inner tube 14 is constrained by the maximum diameter of the non-elastic outer tube 12. The outer tube 12 is formed from a non-elastic, relatively soft, bendable, tubular webbing material. The preferred materials used to form the non-elastic outer tube 12 are braided or woven nylon, polyester, or polypropylene. Other braided or woven materials can also be employed to form the outer tube 12. The requirements of the outer tube 12 material are that it be soft, bendable, non-elastic, and strong enough to withstand internal pressures of up to 250 pounds per square inch, (psi).

The hose 10 includes a female coupler 18 at a first end thereof and a male coupler 16 at a second end thereof. The male coupler 16 includes a threaded portion 20, a mid-portion 22, and a portion 24 onto which are secured the inner tube 14, the outer tube 12, and an expansion restrictor sleeve 26. The inner tube 14, the outer tube 12, and the expansion restrictor sleeve 26 are secure to the male coupler as will be described herein after.

The female coupler 18 includes a threaded portion 28 on the interior of the female coupler, FIGS. 1, 3, and 8. The threaded portion 28 is constructed to receive the male threads 20 and enable coupling of one hose to another. The threaded portion 28 is also constructed to couple to a faucet or a water outlet on the exterior or interior of a house or residence. Most water faucets on homes or residences are provided with a standard size male coupler or fitting. Most conventional garden hoses or other hoses are provided with a standard size female coupler or fitting which will engage and couple the hose 10 to the faucet or water outlet. The inner tube 14, the outer tube 12, and the expansion restrictor sleeve 27 are secure to the female coupler 18 as will be described herein after. In the preferred embodiment the female coupler 18 also includes a washer 29 which helps to provide a fluid tight connection between the male and female couplers or any other male or female coupler.

During assembly, the non-elastic outer tube 12 is attached and connected to the inner tube 14 only at the first end and second end by the male coupler 16 and the female coupler 18, The outer tube 12 is unattached, unconnected, unbonded, and unsecured to the elastic inner tube 14 along the entire length of the inner tube 14, between the two couplers, and thus the outer tube 12 is able to move freely with respect to the inner tube along the entire length of the inner tube 14, between the couplers, when the hose expands or contracts.

Figure 6:
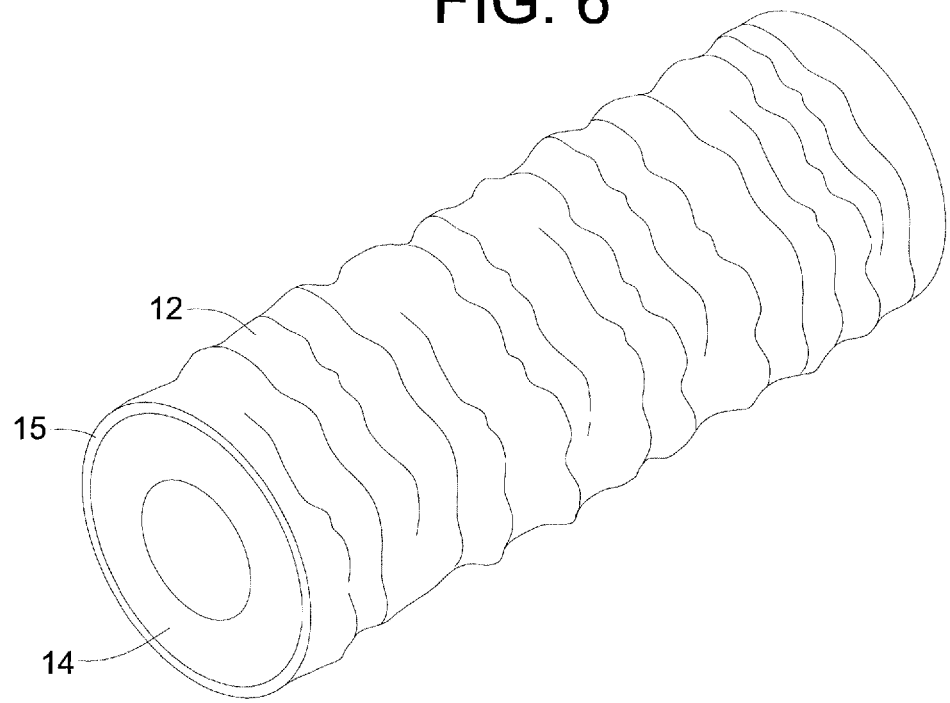
FIG. 6 is a cross sectional view, perspective view of a section of the hose of the present invention taken along line 2-2 in FIG. 1.

The hose 10 of the present invention is illustrated in its contracted condition in FIGS. 1, 2, 6, and 8. In this condition, the elastic inner tube 14 is in a relaxed contracted condition wherein there are no forces being applied to the inner tube 14 to expand or stretch it. Also, it should be noted that the outer tube 12 will not be in contact with the inner tube 14 when the hose is in this contracted condition. There will be a space 15 between the inner tube 14 and the outer tube 12 (FIG. 6). As illustrated in FIG. 6, the thickness of the wall of the inner tube 14, in the contracted position, is relatively large compared to the thickness of the inner tube 14, in the expanded position, FIG. 5. The expansion of the elastic inner tube 14 laterally, is the result of an increase in the pressure and volume of the liquid within the inner tube 14. This increase in pressurized liquid and volume in the inner tube 14 also results in the expansion of the length of the elastic inner tube 14. The expansion of the inner tube 14, both laterally and longitudinally, results in a decrease in the wall thickness of the inner tube, an increase in the diameter of the inner tube thus increasing the volume of liquid that can flow through the inner tube 14. This decrease in wall thickness is clearly illustrated in FIG. 5, wherein the inside diameter of the inner tube has been expanded and extended because of an increase of the pressurized liquid and volume within the inner tube 14.

The outer tube 12 is preferably constructed of a non-elastic, soft tubular webbing. The webbing is made from a strong braided or woven nylon, polyester, or polypropylene fabric or any other tubular braided of woven, non-elastic fabric which can withstand an internal pressure of up to 250 psi. In the expanded or extended condition of the hose 10 of the present invention, FIGS. 3-5, the inner tube 14 is expanded or stretched. In this expanded condition the non-elastic outer tube 12 constrains the lateral expansion of inner tube 14, as illustrated in FIGS. 3 and 5. The outer tube 12 is also taunt, smooth, and relatively flat along its length in this extended condition, note FIGS. 3 and 5. Since the outer tube 12 is non-elastic, the length and width of the outer tube 12 determines the length and width of the hose 10 in its expanded condition. Thus, the diameter and length of the outer tube 12 determines the diameter and length of the hose of the present invention upon the application of pressurized liquid to the interior of the elastic inner tube 14. This diameter and length of the non-elastic outer tube is the final diameter and the final length of the hose 10 when it is in its expanded condition and in use to transport or deliver a liquid, such as water.

In a preferred embodiment of the present invention the hose 10 expands up to 4 to 6 times its contracted length during operation. Thus, a ten-foot hose in a contracted condition would expand up to 40 to 60 feet when liquid under pressure is supplied to the interior of the inner tube 14 of the hose. The pressure within the hose is accomplished by introducing liquid under pressure into one end of the hose and restricting the flow of the liquid out of the other end of the hose, resulting in the liquid filing up and expanding the inner tube 14.

For example, when the hose 10 of the present invention is utilized as a garden hose around a house, coupler 18 is secured to a faucet or water outlet on an exterior wall of the house. The faucet is turned on or opened so that water under pressure can now enter the hose 10. A relatively normal pressure for water within a house is 60 psi. However, the pressure of water within a hose can vary widely, depending on a number of circumstances, such as, the pressure of water supplied by a water utility, the pressure of water supplied by a pump and sustained by an air bladder, when water is supplied from a well, etc. A nozzle or other distributor can be secured to male coupler 16 at the opposite end of hose. The nozzle can be a conventional nozzle which varies the rate and spray pattern of water exiting from the nozzle. Many nozzles are L-shaped so as to be able to be comfortably gripped and used by an individual. These nozzles also have a pivoting on-off handle which operates an internal valve. This internal valve permits, limits, and stops the flow of water through the nozzle, to generate a build-up of liquid within the hose body between the two couplers.

The nozzle provides various amounts of restriction to the liquid exiting at the end of the hose depending on how large the opening in the nozzle is. The smaller the opening in the nozzle, the more the nozzle restricts the release of liquid at the end of the hose, and the higher the pressure and volume of liquid inside the hose. The larger the opening in the nozzle, the less the nozzle restricts the release of liquid at the end of the hose, and the lower the pressure and volume of liquid inside the hose. The pressure coming from a typical house is approximately 60 psi. If the flow of liquid at the other end of the present invention was totally restricted, the psi inside the inner tube would be the same as the pressure coming from the house, 60 psi. At this high pressure, the inner tube 14 and the outer tube 12 in the present invention would expand to its maximum length of fifty feet. As the liquid at the end of the hose is released, the pressure becomes reduced inside the hose and the hose contracts slightly based on the decrease in internal pressure, but the hose remains fully expanded in its operational state, distributing water through its sprayer. The present invention will fully expand even when the pressure provided into the female end is below the typical pressure of 60 psi coming from a house.

In one example, the water pressure coming from the house was 60 psi and the water pressure at the nozzle on the other end of the hose was 35 psi, from the fluid dynamics of water flowing through an open but partially restricted hose. Even with this pressure drop along the length of the hose 10 from 60 psi to 35 psi, the pressure is enough to cause the inner tube 14 to expand laterally and longitudinally until its lateral and longitudinal expansion became constrained by the non-elastic outer tube 12 and expanded to the maximum length and width of the non-elastic outer tube 12. In a preferred embodiment, the hose 10 expands from ten feet in length in its contracted condition to fifty feet in length in its expanded condition.

FIGS. 7 and 8 illustrate how male and female couplers 16 and 18 respectively are secured to the hose of a preferred embodiment of the present invention. In FIG. 7 the male coupler 16 includes a plurality of threads 20. The male coupler 16 also includes a tubular extension 32 which extends into the interiors of the inner tube 14, the outer tube 12 and the expansion restrictor sleeve 26. The tubular extension 32 has a hollow interior 34 through which fluids can flow. A securing device 34 encompasses the outer sleeve 26, the outer tube 12, and the inner tube 14 and secures these elements to the tubular extension 34. A separate flow restrictor 37 is illustrated within coupler 16. Other types of flow restrictors, such as hose nozzles, sprayers, etc. can also be employed. Anything that controls the release of the liquid exiting the hose can be employed. As can be seen in FIG. 7, the outer tube 12 is relatively smooth, the inner tube wall is relatively thin, compared to its thicker contracted condition and the expansion restrictor sleeve 26 is restricting the expansion of the inner and outer tubes at the junction of the securing device 34. Without the sleeve 26, the inner tube would immediately expand outwardly in a step function and probably rupture. The sleeve 26 permits the inner tube 14 to gradually expand and taper outwardly, thus preventing rupturing of the inner tube at this junction. Other types of connections, such as clamping and swaging can also be employed to secure the male coupler to the inner tube 14, the outer tube 12, and the sleeve 26. By using other types of connections, an expansion restrictor sleeve may not be needed.

FIG. 8 illustrates the female coupler 18 secured to the hose of the present invention. The hose in FIG. 8 is in the contracted condition. The female coupler 18 is provided with a plurality of internal threads 28. The threads 28 are designed to interact and cooperate with complementary threads 20 on a male coupler to provide a fluid tight connection between the male and female couplers 16 and 18. The female coupler 18 also includes a tubular extension 36 which extends into the interiors of the inner tube 14, the outer tube 12 and the expansion restrictor sleeve 27. The tubular extension 36 has a hollow interior 38 through which fluids can flow. A securing device 40 encompasses the outer sleeve 27, the outer tube 12, and the inner tube 14 and secures these elements to the tubular extension 36. As can be seen in FIG. 8, the soft fabric outer tube 12 is not smooth, but folded, compressed and gathered around the circumference of the inner tube 14, the inner tube 14 wall is relatively thick, compared to its extended condition and the sleeve 27 is not restricting expansion of the inner and outer tubes at the junction of the securing device 40. Without the sleeve 27, the inner tube 14 would immediately expand outwardly in a step function and probably rupture upon the application of pressurized liquid to the interior of hose 10. The sleeve 27 permits the inner tube 14 to gradually expand and taper outwardly, thus preventing rupturing of the inner tube at this junction. Other types of connections, such as clamping and swaging can also be employed to secure the female coupler to the inner tube 14, the outer tube 12, and the sleeve 27. By using other types of connections, an expansion restrictor sleeve may not be needed.

Another feature of the present invention is the savings in weight of the hose. The hose 10 in its contracted condition is relatively light and after it is expanded up to 4 to 6 times, the weight of the hose does not increase. Also, because the hose does not contain any metal components such as springs, wire mesh or other metal parts along the entire length of the hose between the male connector and the female connector a ten-foot contracted hose may only weigh less than 2 pounds and in the expanded condition, (not counting the weight of the liquid inside the expanded hose) the fifty-foot hose would also only weigh less than 2 pounds. In contrast however, a conventional rubber ½ inch ID 50-foot hose could weigh up to 12 pounds. This savings in weight enables the hose of the present invention to be easily carried, easily dragged, easily handled and easily used by anyone who uses the hose but especially by individuals who do not posses exceptional strength or do not want to drag, carry or lug around heavy, bulky, conventional rubber hoses.

Another feature of the present invention is that the outer tube 12 is reduced or decreased in length when there is no pressure within inner tube 14. With no pressure or volume in the elastic inner tube 14 the inner tube automatically contracts. The condition of the outer tube 12 when the inner tube 14 is in the contracted condition is illustrated in FIGS. 1, 2 and 6. Because the outer tube is unconnected, unattached, unsecured, or unbonded to the inner tube along the entire length of the hose between the first end and the second end, the soft fabric material of the outer tube 12 can move freely with respect to the inner tube. The fact that the outer tube 12 can move freely with respect to the inner tube 14 along the entire length of the hose 10 enables the outer tube 12 to become folded, compressed and gathered around the outside of the circumference of the inner tube 14 along its length in the contracted condition when there is not pressurized liquid within the inner tube 14. The flexibility of the outer tube 12 to become folded, compressed and gathered condition of the outer tube 12 helps prevent the hose 10 from kinking and also helps prevent it from becoming entangled upon itself. Thus, an empty hose 10 in the contracted condition is easily stored without worry of the hose kinking or becoming entangled, as most conventional hoses do, because the elastic inner tube and the outer tube are very flexible. This tendency of the hose 10 to not become kinked or entangled enables a user to store the hose 10 in a very small space with no worry of having to untangle or unkink the hose when it is removed from storage and used. A user of the present invention can take hose 10 from a stored condition, secure a nozzle or other flow restrictor on one end of the hose, secure the hose 10 to a water faucet and turn on the water without the fear of the hose becoming entangled or kinked or without the need to untangle or unkink the hose.

After they are used conventional garden hoses are normally carried or dragged back to their place of storage and they are stored on a reel or coiled up upon themselves and laid on a flat surface. This requires time to carry and drag the hose and to properly store the hose and also requires an expense to purchase the hose reel. The hose 10 of the present invention automatically and quickly contracts to its original place of storage and can then be easily folded up, rolled up, or coiled up and stored in any container, even very small containers, or on any surface, thus saving time and expense for the owner of the hose.

FIGS. 5 and 6 illustrate a preferred embodiment of the present invention. During the assembly of the hose in the preferred embodiment a ten-foot elastic inner tube 14 in its relaxed or contracted condition is inserted into the hollow interior of a 50-foot non-elastic outer tube 12. The ten-foot inner tube 14 and the 50-foot outer tube 12 and the expansion restrictor sleeve 27 are then all attached and secured together on a coupler at the first end. The ten-foot inner tube is then stretched or expanded through the hollow interior of the outer tube 12 until the elastic inner tube 14 is expanded to 5 times its relaxed or contracted length. At this point in the assembly process the expanded elastic inner tube 14 and the non-elastic outer tube 12 are both clamped down and the inner tube 14 and the outer tube 12 are both 50 feet long. The inner tube 14, and the outer tube 12 and the expansion restrictor sleeve 27 are then attached and secured together to the coupler at the second end while the hose is still in the expanded condition. As previously stated, the elastic inner tube 14 and the non-elastic outer tube 12 are only attached and secured together at the first end and the second end. The inner tube 14 and the outer tube 12 are unattached, unbonded, unconnected and unsecured along the entire length of the hose between the first end and the second end so as to allow the inner and outer tubes to move relative to each other between the couplers. This allows the non-elastic outer tube 12 to move freely with respect to the inner tube 14 along the entire length of the hose between the couplers on the first end and the second end.

When the clamp is removed at the second end from the expanded 50-foot elastic inner tube 14 and the 50 foot non-elastic outer tube 12, the expanded elastic inner tube 14 automatically contracts within itself back to its original relaxed length of ten feet. The length of the 50-foot non-elastic outer tube 12 is also reduced to only ten feet in the contracted condition because when the stretched and extended elastic inner tube 14 contracts from its expanded length, the unattached, unbonded, unconnected and unsecured soft fabric non-elastic outer tube 12 is contracted by the couplers pulling together, as this happens, the outer fabric also catches on the rubbery elastic inner tube 14 material causing the outer tube 12 to become folded, compressed and gathered relatively evenly around the outside circumference along the entire length of the contracted inner tube 14, as opposed to bunching only at the far end of the inner tube 14. Thus, because the 50-foot non-elastic outer tube 12 has many folds that are compressed and gathered around the 10-foot contracted and relaxed inner tube 14, the folded, compressed and gathered 50-foot outer tube 12 measures the same 10-foot length as the 10-foot contracted inner tube 12.

When a pressurized liquid is introduced into the elastic inner tube 14 in the contracted and relaxed condition, the elastic inner tube 14 begins to expand laterally and longitudinally and the outer tube 12 begins to unfold and uncompresses around the circumference of the elastic inner tube 14. Consequently, when the inner tube 14 expands to its maximum length of 50 feet, the outer tube 12 unfolds, and uncompresses along the entire length of the inner tube 14 until it reaches the same 50-foot length as the inner tube 14 in the expanded condition. Also, because the inner tube 14 expands both longitudinally and laterally and its expansion is constrained by the non-elastic outer tube 12, the inner tube 14 fills all the available space inside the non-elastic outer tube 12 and thus the surface of the unfolded, uncompressed outer tube 12 becomes smooth in the expanded condition as depicted in FIG. 5.

The hose in FIG. 5 is shown in its expanded condition after a liquid under pressure has been introduced into the hose and the pressure and volume of the liquid has increased inside the inner tube 14. The expanded length of the hose 10 is now 50 feet, 600 inches, or 15.24 meters. The volume of fluid within the hose 10 is 0.943 gallons, 120 ounces, 3.569 liters, or 3180.64 cubic centimeters. The outer circumference of the hose 10 is 2.12 inches or 5.39 centimeters. The diameter of the outer tube 12 is 0.68 inches or 1.73 centimeters. The diameter of the inner tube 14 is 0.64 inches or 1.63 centimeters. The thickness of the wall of the inner tube 14 is 0.031 inches or 0.079 centimeters. The thickness of the outer tube 12 is 0.031 inches or 0.079 centimeters. The thickness of the outer tube 12 remains the same in both the expanded and contracted conditions. The material from which the inner tube 14 is formed can be any color. The hose in FIG. 6 is in its contracted condition and its dimensions are as follows. The length of the hose is 10 feet, 3.33 yards, or 3.05 meters. The volume of liquid within the hose 10 is 0.025 gallons, 3.2 ounces, 0.094 liters, or 94.635 cubic centimeters. The outer circumference of the hose 10 is 2 inches or 5.08 centimeters. The diameter of the outer tube 12 is 0.4 inches or 1.02 centimeters. The inside diameter (ID) of the inner tube 14 is, 0.25 inches or 0.635 centimeters. The outside diameter (OD) of the inner tube 14 is 0.375. The thickness of the wall of the inner tube 14 is 0.125 inches or 0.317 centimeters. The thickness of the outer tube 12 is 0.031 inches or 0.079 centimeters.

The outer tube 12 is relatively smooth in the expanded condition, as seen in FIGS. 3 and 5. This smooth surface enables the hose 10 to be used and manipulated with relative ease. In addition, the expanded elastic inner tube 14 and the smooth surface of the outer tube 12 prevents the hose from kinking. Also, the smooth surface enables indicia to be placed on the outer surface. An example of this indicia is illustrated in FIG. 5, the words "Magic Hose". All types of indicia can be placed on the exterior of the outer tube 12, such as letters, numbers, patterns, designs, and/or pictures. Any type of indicia that can be affixed to the outer tube 12 can be used. The indicia can be any color also including black or white. The material from which the outer tube 12 is formed can also be any color.

The preferred embodiment of the present invention utilizes water to fill and expand the hose 10. However, other liquids can also be employed with the present invention, so long as the liquids are not corrosive to the inner tube 14. The temperatures of the liquids employed in the present invention are lower than temperatures which will alter the physical and chemical properties of the materials used in the hose of the present invention. Also, because the inner tube 14 is elastic it can expand if the water within the tube freezes. For example, if a garden hose of the present invention were left outside in the winter, the water contained therein would freeze. Normal garden hoses would split, but the present invention would expand when the water turns to ice because the inner tube is elastic.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A hose comprising:
  a flexible elongated outer tube constructed from a fabric material having a first end and a second end, an interior of said outer tube being substantially hollow, said flexible elongated outer tube having a maximal length and a maximal diameter;

a flexible elongated inner tube having a first end and a second end, an interior of said inner tube being substantially hollow, said inner tube being formed of an elastic material, said elastic inner tube having a relaxed length when said inner tube is not being stretched, said inner tube relaxed length being substantially less than said outer tube maximal length;

a first coupler secured to said first end of said inner and said outer tubes, said first coupler constructed to couple said hose to a source of pressurized liquid;

a second coupler secured to said second end of said inner and said outer tubes, said inner and outer tubes unsecured between said first and second ends so that said outer tube is not held in frictional contact with said inner tube so that said outer tube can move freely along said inner tube; and a flow restrictor coupled to said second coupler, whereby upon introduction of a flow of pressurized liquid through said first coupler into said inner tube and operation of said flow restrictor to at least partially block said flow of pressurized liquid from exiting said inner tube, said inner tube fills with pressurized liquid resulting in an increase in fluid pressure within said inner tube interior, said increase in fluid pressure expands said inner tube longitudinally along a length of said inner tube and laterally across a width of said inner tube thereby increasing said hose to an expanded condition, and whereby stopping said flow of pressurized liquid into said first coupler and releasing said pressurized liquid out of said second coupler results in said hose contracting to a decreased length as a result of the automatic contraction of the elastic inner tube.

2. The hose of claim 1 wherein said outer tube is made from a material which will not stretch longitudinally or laterally when a force is applied to an interior of said outer tube.

3. The hose of claim 2 wherein said outer tube is made from a material selected from the group consisting of nylon, polyester, or polypropylene.

4. The hose of claim 1 wherein said inner tube is made from an elastic material with an elongation ratio of up to six to one and which can expand up to six times its contracted or unexpanded length.

5. The hose of claim 1 including a first restrictor sleeve secured to said first end of said inner and said outer tubes, and a second restrictor sleeve secured to said second end of said inner and said outer tubes, whereby said first and second restrictor sleeves provide a gradual transition of the laterally outward expansion of said inner tube when there is an increase in pressurized liquid within said inner tube interior between said first coupler and said second coupler.

6. The hose of claim 1 wherein said inner tube and said outer tube are made from flexible materials which will not kink or become entangled upon itself when said inner and said outer tubes are in their expanded condition.

7. The hose of claim 5 including a first securing device securing said first restrictor sleeve, said outer tube, and said inner tube to said first coupler, and a second securing device securing said another expansion restrictor sleeve, said outer tube and said inner tube to said second coupler.

8. The hose of claim 1 including indicia on said outer tube.

9. The hose of claim 8 wherein said indicia is recognizable when said hose is in said extended condition and said indicia is not recognizable when said hose is in said retracted condition.

10. The hose of claim 1 wherein said flow restrictor is integrally formed with said second coupler.

11. The hose of claim 1 wherein said flow restrictor is a nozzle which is removeably secured to said hose.

12. The hose of claim 7 wherein said first and second securing devices extend around an outer circumference of said hose.

13. The hose of claim 1 wherein said hose is a garden hose.

14. The hose of claim 1 wherein said hose is a fire hose used by firefighters.

15. The hose of claim 1 wherein said inner tube and said outer tube are made from flexible materials which will not kink when said inner and said outer tubes are in their contracted condition.

16. A method of transporting a liquid comprising:

forming an expanding hose, said expanding hose including a non-elastic, bendable elongated outer tube having a first end and a second end, an interior of said outer tube being substantially hollow, said expanding hose including an expandable, elastic elongated inner tube having a first end and a second end, an interior of said inner tube being substantially hollow, said elastic inner tube positioned within said substantially hollow outer tube;

securing a first coupler to said first end of said inner and said outer tubes;

securing a second coupler to said second end of said inner and said outer tubes, said inner and said outer tubes being secured to each other only at said first and said second ends and unsecured to each other between said first and said second ends;

connecting said first coupler to a source of pressurized fluid;

connecting said second coupler to a fluid flow restrictor;

introducing a flow of pressurized liquid into said expanding hose through said first coupler;

restricting said flow of pressurized liquid exiting the expanding hose, resulting in an increase in fluid pressure within said expanding hose between said first and second couplers causing said inner tube to expand longitudinally along a length of said inner tube and laterally across a width of said inner tube thereby increasing a length and width of said hose to an extended condition; and automatically contracting said expanding hose to a decreased length and width by removing said flow of pressurized liquid into said expanding hose and removing the increase in fluid pressure within said expanding hose between said first coupler and said second coupler, whereby said inner tube moves freely with respect to said outer tube when there is no fluid pressure differential between said first coupler and said second coupler.

17. The method of transporting a fluid of claim 16 wherein said elastic inner tube is elongated up to six times its contracted or unexpanded length.

18. The method of transporting a fluid of claim 16 including securing a first expansion restrictor sleeve to said first end of said inner and said outer tubes;

securing a second expansion restrictor sleeve to said second end of said inner and said outer tubes;

whereby when said increase in fluid pressure expands said inner tube, said first and second expansion restrictor sleeves restrain the expansion of said inner and said outer tubes and prevent said inner tube from increasing in diameter as a step function.

19. The method of transporting a fluid of claim 16 including providing indicia on said outer tube and expanding said outer tube longitudinally along a length of said outer tube until said indicia is recognizable.

20. The method of transporting a fluid of claim 16 wherein said outer tube constrains the lateral or radial expansion and the longitudinal expansion of said inner tube upon an increase of said fluid pressure between said first coupler and said second coupler within said hose.

\* \* \* \* \*

UNITED STATES PATENT AND TRADEMARK OFFICE
CERTIFICATE OF CORRECTION

| | | |
|---|---|---|
| PATENT NO. | : 10,174,870 B2 | |
| APPLICATION NO. | : 15/794662 | |
| DATED | : January 8, 2019 | |
| INVENTOR(S) | : Michael J. Berardi et al. | |

It is certified that error appears in the above-identified patent and that said Letters Patent is hereby corrected as shown below:

On the Title Page

Item (12) "Berardi" should read --Berardi et al.--

Replace:
(72) Inventor: Michael J. Berardi, Palm Beach Gardens, FL (US)
With:
(72) Inventors: Michael J. Berardi, Palm Beach Gardens, FL (US); Gary Dean Ragner, Gainesville, FL (US)

Signed and Sealed this
Second Day of January, 2024

Katherine Kelly Vidal
*Director of the United States Patent and Trademark Office*